US012670164B2

(12) United States Patent
    Ezrielev et al.

(10) Patent No.: US 12,670,164 B2
(45) Date of Patent: Jun. 30, 2026

(54) DATABASE MANAGEMENT BASED ON PREDICTED RETRIEVAL OF DATA

(71) Applicant: Dell Products L.P., Round Rock, TX (US)

(72) Inventors: Ofir Ezrielev, Be'er Sheva (IL); Jehuda Shemer, Kfar Saba (IL); Boris Shpilyuck, Ashdod (IL)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 18/443,797

(22) Filed: Feb. 16, 2024

(65) Prior Publication Data

US 2025/0265250 A1    Aug. 21, 2025

(51) Int. Cl.
    *G06F 16/2455*        (2019.01)
    *G06F 11/34*          (2006.01)

(52) U.S. Cl.
    CPC .... *G06F 16/24552* (2019.01); *G06F 11/3476* (2013.01)

(58) Field of Classification Search
    CPC ..................... G06F 16/24552; G06F 11/3476
    USPC ......................................... 707/769
    See application file for complete search history.

(56) References Cited

U.S. PATENT DOCUMENTS

| | | | |
|---|---|---|---|
| 11,984,208 B2 | 5/2024 | Athey | |
| 12,045,199 B1 * | 7/2024 | Sorenson, III | ........ G06F 16/185 |

| | | | | |
|---|---|---|---|---|
| 2015/0186434 A1 * | 7/2015 | Eichinger | ........... | G06F 16/2477 |
| | | | | 707/693 |
| 2018/0219889 A1 * | 8/2018 | Oliner | ....................... | G06N 3/04 |
| 2019/0220533 A1 * | 7/2019 | Guisado | ........... | G06F 16/24564 |
| 2020/0151291 A1 * | 5/2020 | Bhattacharyya | ....... | G01C 21/20 |
| 2020/0167422 A1 * | 5/2020 | Jayasingh | ........... | G06F 16/1748 |
| 2020/0167423 A1 * | 5/2020 | Jayasingh | ........... | G06F 12/0871 |
| 2021/0089509 A1 * | 3/2021 | Jayasingh | ........... | G06F 12/0871 |
| 2022/0150125 A1 | 5/2022 | Kumar | | |
| 2023/0186070 A1 | 6/2023 | Makhija | | |
| 2024/0314608 A1 | 9/2024 | Alanis | | |
| 2025/0068133 A1 | 2/2025 | Hegde | | |
| 2025/0138729 A1 * | 5/2025 | Zhao | ..................... | G06F 3/0673 |

* cited by examiner

*Primary Examiner* — Joshua Bullock

(74) *Attorney, Agent, or Firm* — WOMBLE BOND DICKINSON (US) LLP

(57)                    ABSTRACT

Methods and systems for managing data are disclosed. Data may be stored in a database based on a likelihood that the data is to be read from the database. Data may be stored as a reduced-size representation of the data if the data is unlikely to be read from the database. Some requests for data may be associated with timeliness requirements. If data associated with a timeliness requirement is stored as a reduced-size representation, a likelihood of violating the timeliness requirement while reconstructing the data may be increased. Therefore, data that is likely to be requested may be stored in a reconstructed full-size form in a cache of the database. By doing so, the reconstructed full-size forms of the data may be retrieved from the cache and used for providing computer-implemented services in compliance with timeliness requirements for the data.

20 Claims, 6 Drawing Sheets

DATABASE MANAGEMENT BASED ON PREDICTED RETRIEVAL OF DATA

FIELD

Embodiments disclosed herein relate generally to databases. More particularly, embodiments disclosed herein relate to systems and methods to manage storage of data in databases.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
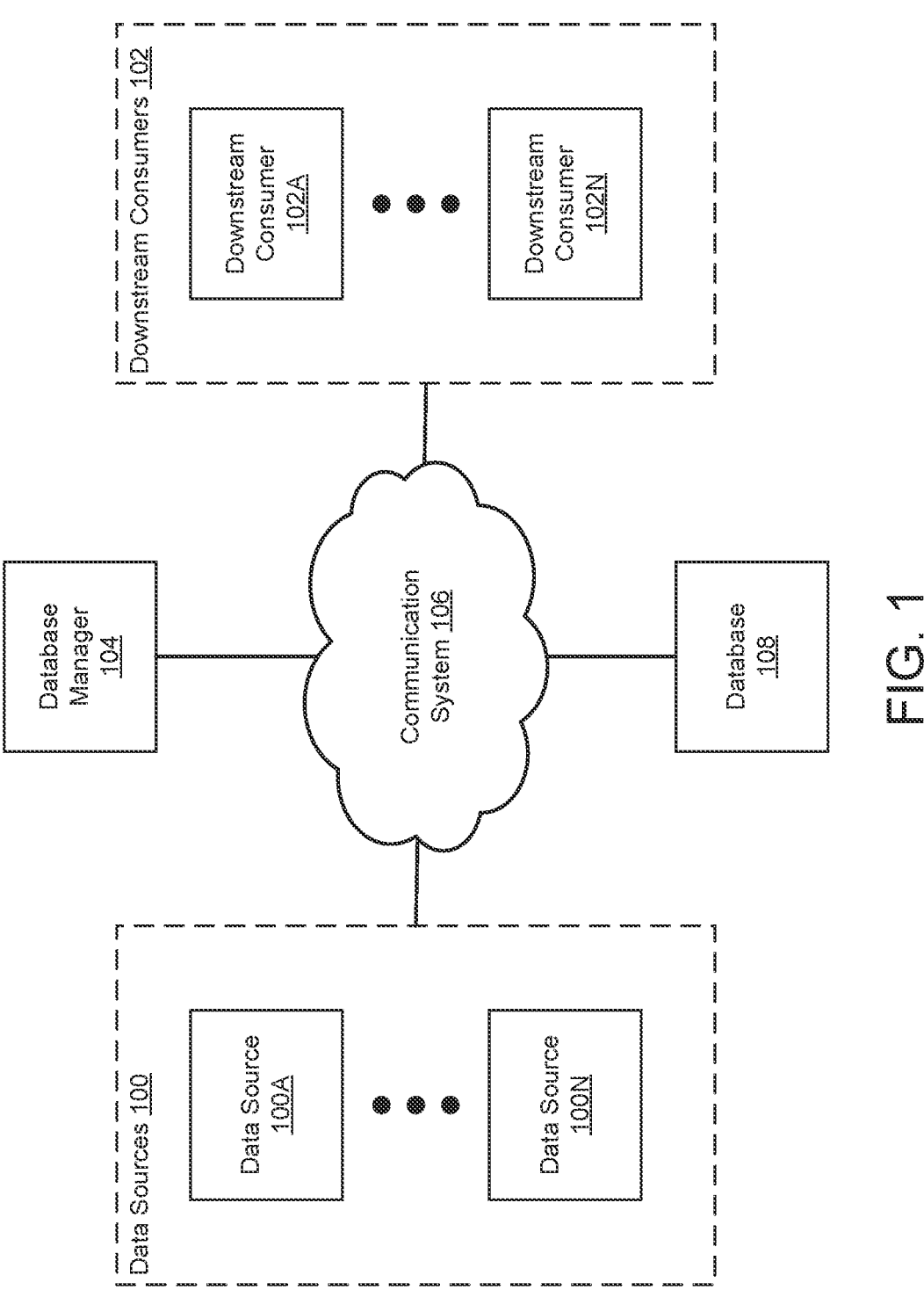
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data stored in a database. The database may store any amount of data and may receive queries (e.g., requests) for the data from other entities. The data stored in the database may include large amounts of data in the form of time-series relationships. The data may be queried, for example, for use as ingest for an inference model, for data analysis, and/or for other purposes.

Some requests for the data may have an associated timeliness requirement. The timeliness requirement may request that the data be provided within a particular duration of time following receipt of the request in order to satisfy the timeliness requirement.

However, the requested data may be stored in the database as a reduced-size representation of the data for any reason (e.g., to consume fewer storage resources in the database). The reduced-size representation of the data may be based on a difference between a measurement of a time-series relationship and an inference intended to predict the measurement. Therefore, the inference and the difference may be used to reconstruct the data.

Delays may occur following receipt of a request for a measurement stored in the database if the measurement is stored as a difference. The delays may occur due to, for example, a time requirement for reconstructing the measurement (e.g., using the inference and the difference) prior to servicing the request. As the inference used to generate the difference may not be stored in the database, any number of inferences may be re-generated by an inference model to complete the reconstruction of the measurement. Doing so may increase a likelihood of violating the timeliness requirement due to the delays associated with inference generation and reconstruction of the measurement.

To reduce delays associated with servicing requests for data, checkpoints may be stored in the database along with the differences. A checkpoint may include a measurement of the time-series relationship that has an increased likelihood of being read from the database (and/or measurements occurring prior to the measurement in the time series). Therefore, a requested measurement (e.g., data point) may be reconstructed by identifying a checkpoint from the time-series relationship that occurred most closely in time to the requested data point and generating inferences to predict measurements occurring at points in time after the checkpoint. Consequently, fewer inferences may be generated when compared to regenerating inferences for an entire (or a substantial portion of) the time-series relationship.

To further reduce delays associated with servicing the requests for data, portions of the time-series relationship that are stored as differences and are identified as likely to be read from the database may be proactively regenerated and stored in a cache of the database. Data may have an increased likelihood of being requested, for example, based on historical uses of portions of the data from the database, relationships between different portions of the data, timeliness requirements associated with the data, anomalousness of portions of the data, etc.

Thus, embodiments disclosed herein may provide an improved system for managing data so that delays in retrieval of the data from a database may be reduced. Consequently, a likelihood of fulfilling requests for data in accordance with timeliness requirements for the data may be increased. The disclosed embodiments may address this technical problem by storing checkpoints associated with time-series relationships in a database and storing reconstructed forms of data in a cache so that retrieval of the reconstructed data may be completed timely.

In an embodiment, a method for managing data is provided. The method may include: obtaining a portion of the data for storage; making a determination regarding whether the portion is likely to be read after the portion is stored in a database; in a first instance of the determination where the portion is likely to be read: storing the portion in the database; in a second instance of the determination where the portion is unlikely to be read: obtaining a reduced-size representation of the portion; and storing the reduced-size representation rather than the portion in the database.

The portion of the data may include information regarding a time-series relationship.

Making the determination may include: identifying whether the portion of the data is anomalous with respect to the time-series relationship; and in an instance of the identifying where the portion of the data is anomalous: concluding that the portion is likely to be read.

Making the determination may include: obtaining historical read trends for the database; comparing the portion of the data to the historical read treads to identify whether the portion of the data would have been read in the past; and in an instance of the identifying where the portion of the data would have been read in the past: concluding that the portion is likely to be read.

Obtaining the reduced size representation of the portion may include: obtaining, using a predictive model, an inference for the portion of the data; obtaining a difference between the inference and the portion of the data; and obtaining the reduced-size representation using the difference.

The inference and the difference may be usable to obtain the portion of the data.

The predictive model may be trained to predict a time-series relationship, and the portion of the data may include information regarding the time-series relationship.

The method may also include populating a cache for the database using, at least, the predictive model.

Making the determination may be based, at least in part, on a set of rules.

The set of the rules may be based on portions of the data already stored in the database and the set of the rules may indicate: portions of the data may be stored in the database as full-size forms of data at regular intervals; and the portion may be stored in the database as a full-size form of the data even when the determination concludes that the portion is unlikely to be read based on the regular intervals.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services that may utilize inference models as part of the provided computer-implemented services.

The inference models may be artificial intelligence (AI) models and may include, for example, linear regression models, deep neural network models, and/or other types of inference generation models. The inference models may be used for various purposes. For example, the inference models may be trained to predict measurements, recognize patterns, automate tasks, and/or make decisions.

The computer-implemented services may include any type and quantity of computer-implemented services. The computer-implemented services may be provided by, for example, data sources 100, database manager 104, downstream consumers 102, database 108, and/or any other type of devices (not shown in FIG. 1). Any of the computer-implemented services may be performed, at least in part, using data retrieved from database 108, etc. The computer-implemented services may include other types of services including, for example, data archive management, data analysis, and/or other services.

Data sources 100 may include any number of data sources (100A-100N) that may obtain (i) training data usable to train inference models, (ii) ingest data that is ingestible into trained inference models to obtain corresponding inferences, and/or (iii) data usable to service requests from downstream consumers 102. Data sources 100 may include, for example, data collectors, data aggregators, and/or other devices responsible for obtaining and/or storing data.

Data sources 100 may obtain data in the form of time-series relationships. For example, data sources 100 may include a series of temperature sensors that may collect temperature measurements over time for a particular ambient environment. The time-series relationships (e.g., the temperature measurements over time) may be collected by data sources 100 and may be provided to database manager 104 and/or another entity.

Database manager 104 may manage storage of the data obtained from data sources 100 in database 108 and/or other storage architectures. Due to the large scale of the time-series relationships, database manager 104 may store the data obtained from data sources 100 as reduced-size representations of the data in database 108. To do so, database manager 104 may host and operate an inference model. The inference model may be trained to predict measurements associated with data points of the time-series relationships.

Database 108 may be any large-scale storage architecture including any number of devices usable to obtain data, store data, and/or follow instructions for storing the data. Database 108 may, for example, receive instructions from database manager 104 indicating data to be stored, retrieved, reconstructed, etc. Database 108 may also host a copy of the inference model and may use the copy of the inference model to generate inferences as needed to reconstruct data stored in database 108.

For example, the inference model may be trained (e.g., using training data obtained from data sources 100 and/or from other entities) to predict temperature measurements collected by the temperature sensors associated with data sources 100. Upon receipt of temperature measurements from data sources 100, database manager 104 may compare each temperature measurement to an inference intended to predict the temperature measurement. A difference between the measurement and the inference may be generated and stored in database 108 in place of the data point. By doing so, storage capacity of database 108 and network bandwidth may also be conserved (e.g., due to transmission and storage of the smaller size differences when compared to the full time series in an example that includes a highly distributed environment).

Downstream consumers 102 may provide, all or a portion, of the computer-implemented services. When doing so, downstream consumers 102 may provide requests for data to any entity (e.g., to database manager 104, database 108) and/or may receive the data automatically based on a previously established schedule. Downstream consumers 102 may also indicate (e.g., with the requests for data) a timeliness requirement for receipt of the requested data.

However, if the requested data is stored in database 108 as a difference, database manager 104 (and/or database 108) may regenerate the requested data prior to servicing the request. To do so, any number of inferences for the time series may be generated (e.g., regenerated) using the inference model and the inference model may be re-calibrated and/or otherwise modified to accommodate the request.

For example, consider a scenario in which two inferences (e.g., the requested data and an inference for a measurement collected directly prior to the requested data) are to be regenerated by the inference model to service the request. Doing so may include: (i) predicting, using the inference model, a first predicted value (e.g., first inference) for the measurement collected directly prior to the requested data, (ii) utilizing a difference for the measurement and the first inference to regenerate a first true value for the measurement, (iii) integrating the first true value to an internal state of the inference model to obtain a re-calibrated inference model, (iv) utilizing the re-calibrated inference model to generate a second predicted value (e.g., second inference) for the requested data, (v) utilizing a difference for the requested data and the second inference to regenerate a second true value for the requested data, and/or (vi) other methods.

Doing so may cause delays in servicing the request that may subsequently cause the timeliness requirement to not be met.

In general, embodiments disclosed herein may provide methods, systems, and/or devices for managing data stored in a database so that delays in retrieval of the data stored in the database are reduced. By doing so, the system may be more likely to fulfill timeliness requirements associated with requests for data from downstream consumers 102.

To increase a likelihood of servicing the requests for data from downstream consumers 102 in accordance with the timeliness requirements, database manager 104 may determine whether to store a full-size form of the data, a reduced-size form of the data, and/or another form of the data in database 108 based on a likelihood of the data being requested by downstream consumers 102. To do so, database manager 104 may: (i) obtain a portion of the data for storage in database 108 from data sources 100, and/or (ii) determine whether the portion is likely to be read (e.g., in response to a request) after the portion is stored in database 108. The determination may be based, for example, on an anomalousness of the portion of the data, on historical read trends for other portions of data stored in database 108, etc.

If the portion is likely to be read, database manager 104 may determine whether a satisfactorily-recent checkpoint is stored in database 108. The checkpoint may include: (i) one or more measurements of a time series (time-series relationship) that are likely to be read, (ii) one or more measurements prior to the one or more measurements that are likely to be read in the time series, (iii) metadata associated with the one or more measurements, and/or (iv) other information. The checkpoint may be considered satisfactorily-recent if the checkpoint includes a measurement (e.g., from the time series relationship associated with the portion) measured prior to the portion within a range (e.g., of time, of data point collection) considered acceptable based on any criteria and indicated by any entity.

If the satisfactorily-recent checkpoint is stored in database 108, database manager 104 may: (i) obtain a reduced-size representation of the portion (e.g., one or more differences) and/or (ii) store the reduced-size representation rather than the portion in the database.

If the satisfactorily-recent checkpoint is not stored in database 108, database manager 104 may store the portion in database 108 as a checkpoint.

Checkpoints may also be stored in database 108 based on rules for checkpoint storage, the rules being associated with the inference model and the time series relationship. For example, a rule of the rules may indicate that a checkpoint should be stored in database 108 at regular intervals to ensure that full-size forms of data are available periodically throughout the time series. The regular intervals may be based, at least in part, on the duration of the time series and/or other factors.

If the portion is unlikely to be read, database manager 104 may: (i) obtain a reduced-size representation of the portion (e.g., one or more differences) and/or (ii) store the reduced-size representation rather than the portion in the database.

By storing some number of checkpoints in database 108, only inferences for data points (e.g., measurements) following a checkpoint may be generated to reconstruct requested data. Therefore, delays may be reduced, and timeliness requirements associated with the requests may be more likely to be met.

For example, a request for data from downstream consumers 102 may include a timestamp and may indicate that a temperature measurement corresponding to the timestamp is to be provided to downstream consumers 102 within a particular duration of time. The temperature measurement may be stored in database 108 as a difference (e.g., a reduced-size representation of the temperature measurement). However, a checkpoint may be stored in database 108 that includes a temperature measurement collected one hour prior to the timestamp.

Therefore, to reconstruct the temperature measurement, the inference model may utilize the checkpoint to begin generating inferences corresponding to measurements collected following the checkpoint instead of at the beginning of the time-series relationship. Temperature measurements may be collected, for example, once every thirty minutes. The inference model may generate, therefore, two inferences to generate a prediction for the temperature measurement corresponding to the requested timestamp.

The inference corresponding to the requested timestamp and the difference may be used to reconstruct the temperature measurement and the temperature measurement may be provided to downstream consumers 102.

In addition, database manager 104 may further reduce delays in provision of reconstructed data to downstream consumers 102 by populating a cache of database 108. The cache may be a high-performance storage architecture and may be populated with any amount of proactively reconstructed data. The proactively reconstructed data may be reconstructed prior to receiving a request for the data and in response to an increased likelihood that the data may be requested in the future. Refer to FIGS. 2B-2C for additional details regarding contents of the cache.

To perform the above-mentioned functionality, the system of FIG. 1 may include data sources 100, database manager 104, downstream consumers 102, database 108, and/or other entities. Data sources 100, downstream consumers 102, database manager 104, database 108, and/or any other type of devices not shown in FIG. 1 may perform all, or a portion of the computer-implemented services independently and/or cooperatively.

Figure 2A:
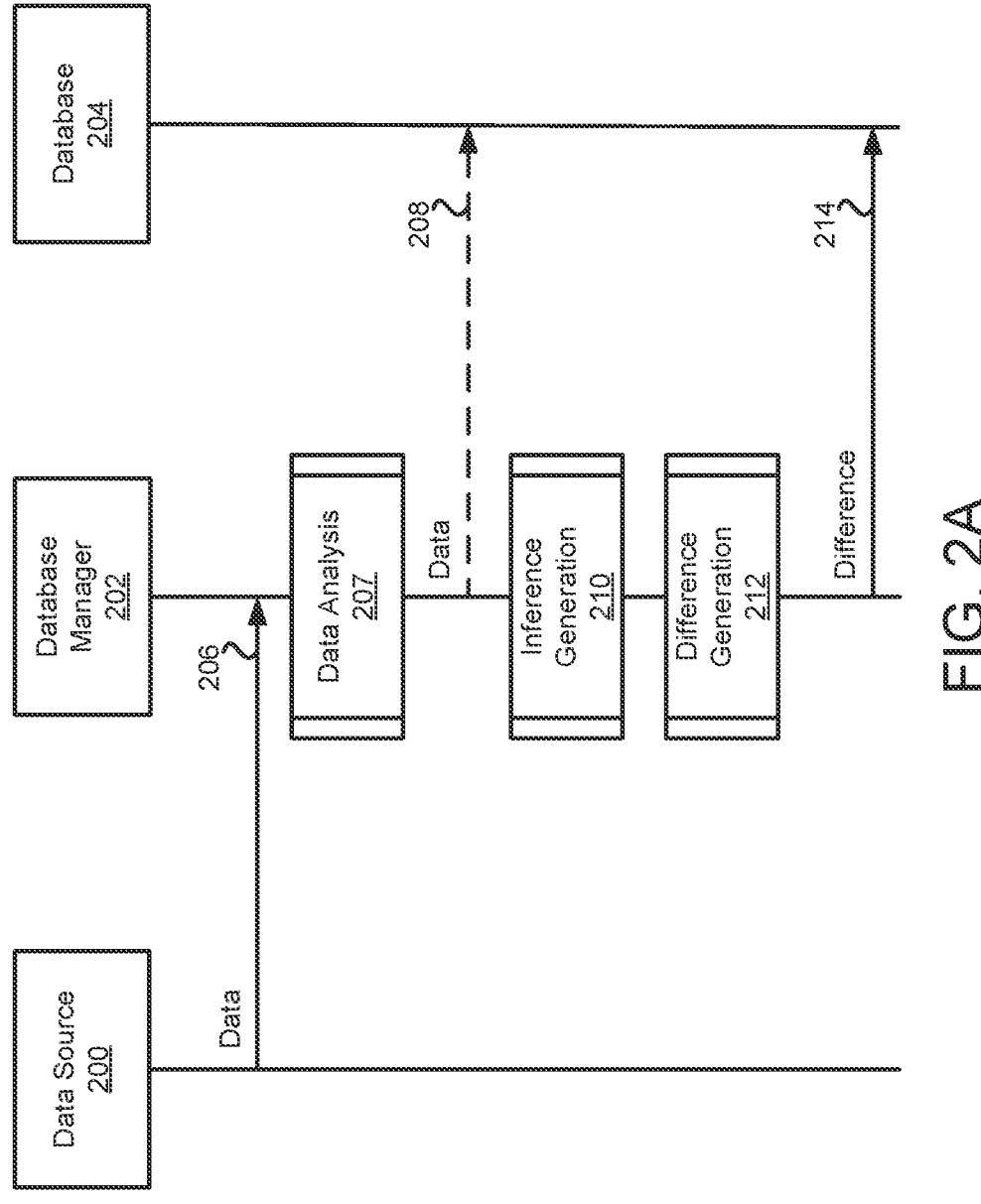
FIG. 2A shows an interaction diagram in accordance with an embodiment.
Figure 2B:
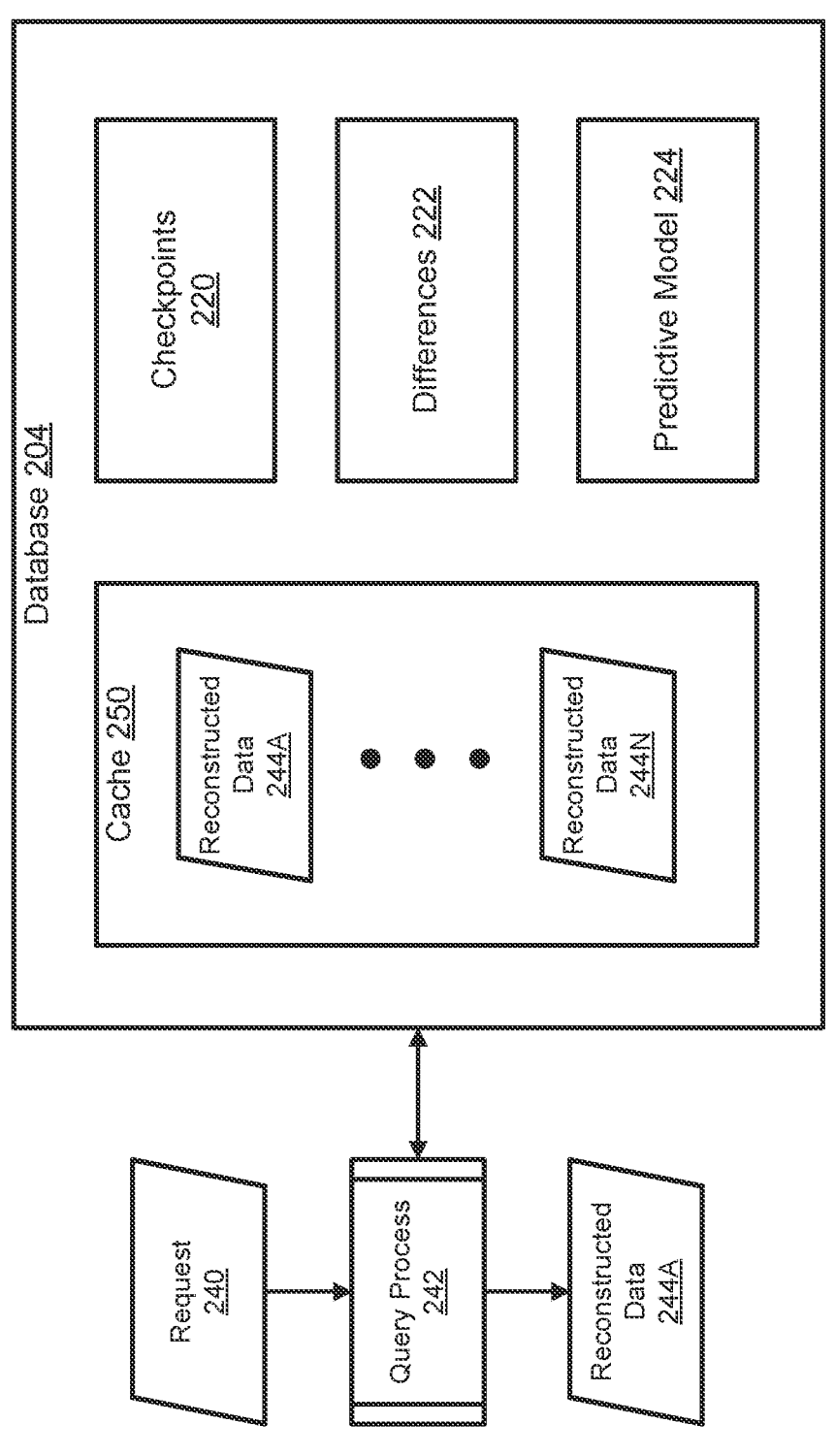
FIGS. 2B-2C show data flow during retrieval of data from a database in accordance with an embodiment.
Figure 2C:
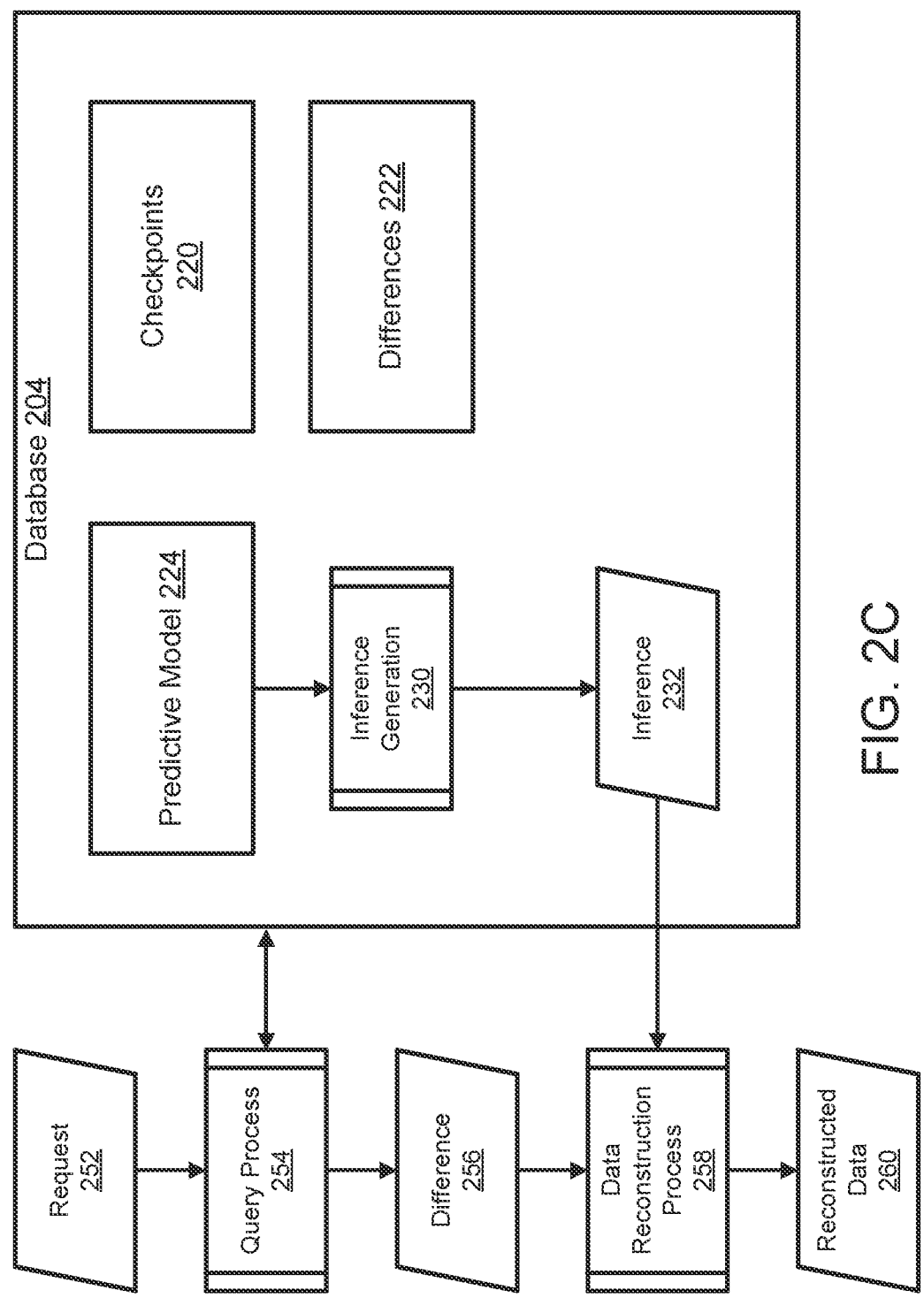
Figure 3:
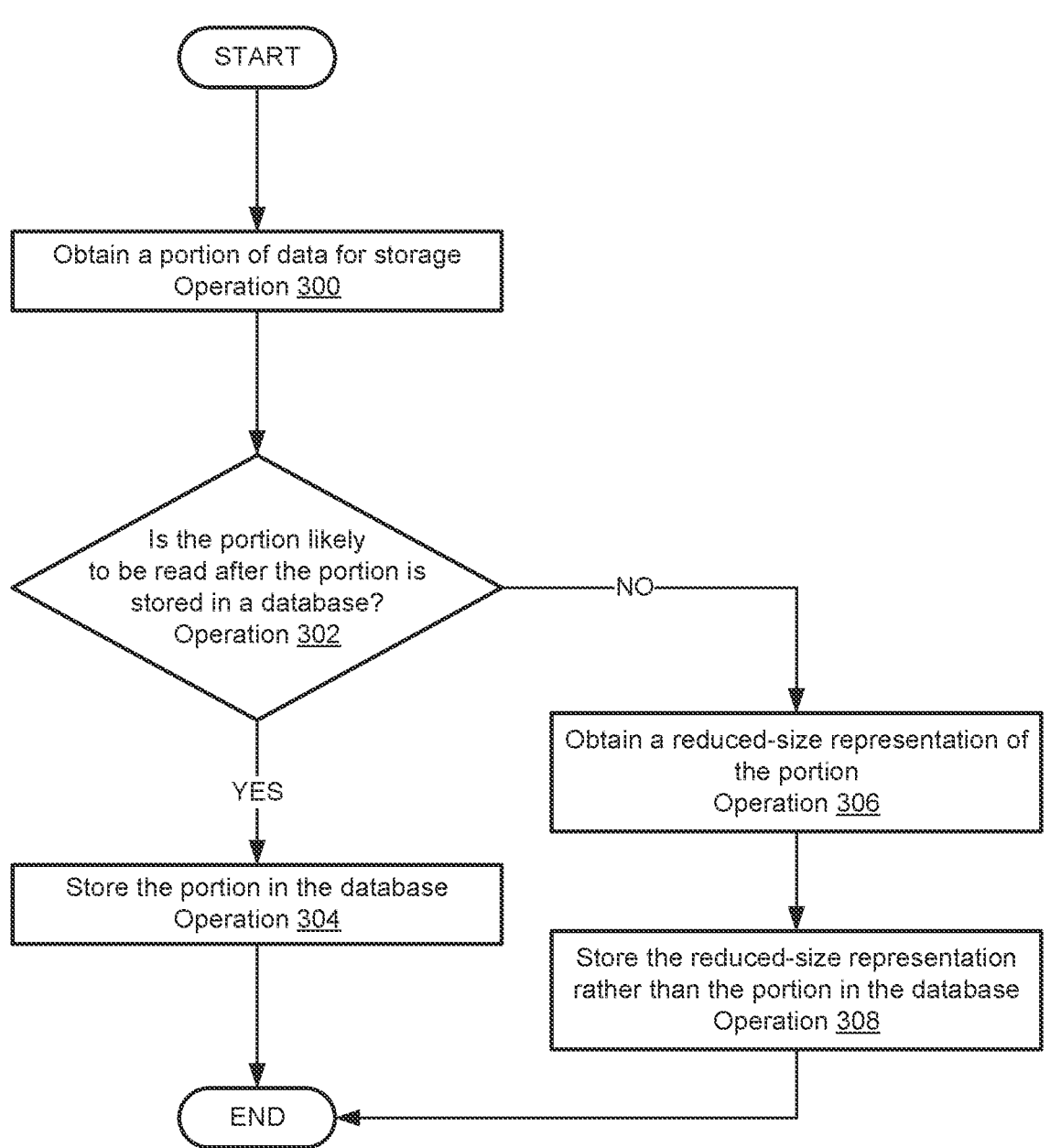
FIG. 3 shows a flow diagram illustrating a method of managing data in accordance with an embodiment.

When performing its functionality, one or more of database manager 104, data sources 100, database 108, and downstream consumers 102 may perform all, or a portion, of the methods and/or actions shown in FIGS. 2A-3.

Any of database manager 104, data sources 100, and downstream consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of database manager 104 and any of the data sources 100, and downstream consumers 102).

While illustrated in FIG. 1 as included a limited number of specific components, a system in accordance with an embodiment may include fewer, additional, and/or different components than those illustrated therein.

The system described in FIG. 1 may be used to reduce the computational cost for data retrieval from a database. The following processes described in FIGS. 2A-2C may be performed by the system in FIG. 1 when providing this functionality.

To further clarify embodiments disclosed herein, an interaction diagram in accordance with an embodiment is shown in FIG. 2A. This interaction diagram may illustrate how data may be obtained and stored within the system of FIG. 1.

In the interaction diagram, processes performed by and interactions between components of a system in accordance with an embodiment are shown. In the diagrams, components of the system are illustrated using a first set of shapes (e.g., data source 200, database manager 202, etc.), located towards the top of each figure. Lines descend from these shapes. Processes performed by the components of the system are illustrated using a second set of shapes (e.g., inference generation 210, etc.) superimposed over these lines. Interactions (e.g., communication, data transmissions, etc.) between the components of the system are illustrated using a third set of shapes (e.g., 206, 208, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 206 may occur prior to the interaction labeled as 208. However, it will be appreciated that the processes and interactions may be performed in different orders, any may be omitted, and other processes or interactions may be performed without departing from embodiments disclosed herein.

Turning to FIG. 2A, an interaction diagram in accordance with an embodiment is shown. The interaction diagram may illustrate processes and interactions that may occur during storage of data (e.g., from data source 200) in a database (e.g., database 204). Data source 200 may be similar to any of data sources 100 described in FIG. 1. Database manager 202 may be similar to database manager 104 described in FIG. 1 and database 204 may be similar to database 108 described in FIG. 1. While shown in FIG. 2A as obtaining data from one data source (e.g., 200), it may be appreciated that database manager 202 may obtain data from any number of data sources without departing from embodiments disclosed herein.

At interaction 206, data may be obtained by database manager 202 from data source 200. The data may include information regarding a time-series relationship. Specifically, the data may include any number of measurements collected over a particular duration of time (e.g., temperature measurements collected over time).

For example, the data may be generated and provided to database manager 202 via (i) transmission via a message, (ii) storing in a storage with subsequent retrieval by database manager 202, (iii) via a publish-subscribe system where database manager 202 subscribes to updates from data source 200 thereby causing a copy of the data to be propagated to database manager 202, and/or via other processes.

Database manager 202 may perform data analysis 207 process using the data. During data analysis 207 process, database manager 202 may determine whether at least a portion of the data is to be stored in database 204 as a checkpoint. A checkpoint may include at least a full-size form of at least one measurement associated with the portion of the data. Data analysis 207 process may include: (i) performing an anomaly detection process to identify a degree of anomalousness of the data, (ii) comparing the data to historical read logs associated with database 204, and/or (iii) other methods. Data analysis 207 process may be performed: (i) continuously as data is obtained from data source 200 over time, (ii) at regular intervals based on batches of data obtained by data source 200, and/or (iii) based on any schedule, criteria, and/or other set of rules for data analysis 207 process.

At interaction 208, database manager 202 may determine that the data is to be stored as a checkpoint and may provide the data to database 204 for storage. For example, the data may be generated and provided to database 204 via (i) transmission via a message, (ii) storing in a storage with subsequent retrieval by database 204, (iii) via a publish-subscribe system where database 204 subscribes to updates from database manager 202 thereby causing a copy of the data to be propagated to database 204, and/or via other processes.

If database manager 202 determines that the data is not to be stored as the checkpoint in database 204, database manager 202 may perform inference generation 210 process. Inference generation 210 process may include generating, using input data and an inference model, an inference intended to predict the data. The input data may include a timestamp associated with the data (and/or multiple time stamps if multiple data points are included in the data) and one or more inferences may be generated as a result of inference generation 210 process (not shown).

Database manager 202 may then perform difference generation 212 process. Difference generation 212 process may include generating a difference between the inference generated during inference generation 210 process and the data. A difference (e.g., including one or more differences) may be obtained as a result of difference generation 212 process. The difference may be a reduced-size representation of the data and may consume fewer storage resources when stored in database 204.

For example, the data may include a temperature measurement collected at a particular time and the inference may include a prediction of the temperature measurement. The difference may indicate how closely the inference predicted the temperature measurement.

At interaction 214, database manager 202 may provide the difference to database 204 for storage. For example, the difference may be generated and provided to database 204 via (i) transmission via a message, (ii) storing in a storage with subsequent retrieval by database 204, (iii) via a publish-subscribe system where database 204 subscribes to updates from database manager 202 thereby causing a copy of the difference to be propagated to database 204, and/or via other processes.

Refer to FIG. 3 for additional details regarding storing checkpoints and differences in a database.

To further clarify embodiments disclosed herein, data flow diagrams in accordance with an embodiment are shown in FIGS. 2B-2C. In these diagrams, flows of data and processing of data are illustrated using different sets of shapes. A first set of shapes (e.g., 240, 244A, etc.) is used to represent data structures, a second set of shapes (e.g., 242, 254 etc.) is used to represent processes performed using and/or that generate data, and a third set of shapes (e.g., 204, 250, etc.) is used to represent large scale data structures such as databases.

Turning to FIG. 2B, a first data flow diagram depicting management of data stored in a database in accordance with an embodiment is shown. The database described in FIGS. 2B-2C may include: (i) checkpoints 220, (ii) differences 222, (iii) cache 250, and/or (iv) predictive model 224.

Checkpoints 220 may include any number of checkpoints. A checkpoint may include a full-size form of data (e.g., a data point) and may include any amount of information (e.g., metadata) associated with the data point. For example, a checkpoint may include the data point, a timestamp associated with the data point, an identifier for the time-series relationship associated with the checkpoint, and/or any information indicating other portions of the time-series relationship that are stored as differences in differences 222. Checkpoints 220 may also include information related to a structure of an instance of an inference model (e.g., predictive model 224) used to generate inferences for the time-series relationship (e.g., weights of a neural network).

Determining when to store data as checkpoints in checkpoints 220 may include processes described in FIG. 2A (e.g., data analysis 207 process) and/or may be based on other policies for checkpoints. A policy for the checkpoints may indicate, for example, that a checkpoint may be saved at regular intervals for a time-series relationship (e.g., every 10,000 measurements).

Differences 222 may include any number of differences (e.g., reduced-size representations of data). The differences may be associated with data points that are members of a time-series relationship. Differences 222 may also include identifiers for checkpoints stored in checkpoints 220 that are associated with same time-series relationships, etc. Differences stored in differences 222 may be quantized (e.g., may be rounded to a nearest quantized value) to conserve storage space in differences 222. In addition, if a difference falls below a certain value (e.g., a difference threshold), the difference may be stored as a difference of zero.

For example, a difference in differences 222 may be stored with an identifier for a closest checkpoint stored in checkpoints 220 to be used to reconstruct the data point associated with the difference.

Cache 250 may be a high-performance storage architecture and may store any quantity of reconstructed data (e.g., 244A-244N). Cache 250 may store reconstructed data corresponding to differences stored in differences 222 and based on measurements predicted to be requested in the future. Cache 250 may store other data other than the reconstructed full-size forms of the data without departing from embodiments disclosed herein.

Content of cache 250 may be managed by an entity responsible for determining which measurements are to be reconstructed and stored in cache 250. Reconstructed data 244A may, for example, be stored in the cache due to a likelihood that reconstructed data 244A is to be requested by downstream consumers 102.

The content of the cache may, therefore, be based in part on historical uses of portions of the data from data sources 100. The content of the cache may also be based on: (i) a likelihood that a difference stored in differences 222 will violate a timeliness requirement when requested, (ii) a relationship between two different portions of the data stored in database 204, (iii) a degree of anomalousness of portions of the data, and/or (iv) other information.

For example, historical uses of portions of the data may include historical logs of requests from downstream consumers 102. The historical logs of requests may be analyzed to identify trends such as: (i) types of data that are requested at particular times and/or in response to particular events, (ii) data sources of data sources 100 from which data are requested over time, and/or (iii) other information related to requests from downstream consumers 102.

Analyzing the historical logs of the requests may include feeding the historical logs of the requests into a second inference model or other rules-based engine trained to interpret historical logs of the requests and use the historical logs of the requests to predict future requests from downstream consumers 102.

The relationship between the two different portions of the data may indicate that the two portions of the data are members of a time series. If the two different portions of the data are members of the time series, each portion of the two different portions of the data may represent a same type of measurement taken at different points in time. For example, a first member of the time series may be a temperature measurement taken by a temperature sensor at a first point in time. Similarly, a second member of the time series may be a temperature measurement taken by the temperature sensor at a second point in time. The first temperature measurement and the second temperature measurement may be stored as differences.

Therefore, if the first member of the time series is requested, a likelihood that the second member of the time series will be requested may increase. If the likelihood that the second member of the time series will be requested exceeds some criteria (e.g., a threshold), the second member of the time series may be selected for reconstruction and storage in cache 250.

Determining which reduced-size forms of data to reconstruct and store in cache 250 may include management of the second inference model, a set of rules, and/or another device responsible for ingesting metadata related to data requests from downstream consumers 102 (e.g., the historical uses of the portions of the data from the database, the relationship between the two different portions of the data, the likelihood that the use of the reduced-size form of the portion of the data is likely to violate the timeliness requirement). Other information may be used to determine the content of cache 250 without departing from embodiments disclosed herein.

Predictive model 224 may be a copy of the inference model hosted and operated by database manager 202 described in FIG. 2A. Predictive model 224 may be operated by database 204 in order to reconstruct data requested by downstream consumers 102.

A downstream consumer (e.g., downstream consumer 102A) may provide a data request (e.g., request 240) to any entity responsible for managing data requests. Request 240 may indicate: (i) a quantity and/or type of data to be provided to downstream consumer 102A, (ii) one or more data sources of data sources 100 from which to retrieve the data, (iii) a timestamp associated with the data, and/or (v) other information.

For example, request 240 may include a timeliness requirement. The timeliness requirement may be based on a service level agreement (SLA) indicating that data are to be provided to downstream consumer 102A within a duration of time following receipt of the data request.

Request 240 may be used to perform query process 242. Query process 242 may include searching database 204 to identify whether the data requested by request 240 is stored in differences 222, checkpoints 220, cache 250 and/or other storage locations. Query process 242 may include searching cache 250 to determine whether a reconstructed form of the data indicated by request 240 is stored in cache 250.

In FIG. 2B, query process 242 may include determining that reconstructed data 244A is the reconstructed form of the data indicated by request 240 and, therefore, the reconstructed form of the data indicated by request 240 is stored in cache 250.

Query process 242 may include retrieving reconstructed data 244A from cache 250. Reconstructed data 244A may be a previously reconstructed (e.g., using an inference generated by predictive model 224 and/or an inference model hosted by database manager 202 and a difference from differences 222) form of the data indicated by request 240. Reconstructed data 244A may be used to service request 240. Servicing request 240 may include encapsulating reconstructed data 244A in a message and providing the message to downstream consumer 102A.

Turning to FIG. 2C, a second data flow diagram depicting management of data stored in a database in accordance with an embodiment is shown.

A downstream consumer (e.g., downstream consumer 102A) may provide a second data request (e.g., request 252) to any entity responsible for managing data requests. Request 252 may be similar to request 240 described in FIG. 2B but may indicate different data to be retrieved from database 204.

Request 252 may be used to perform query process 254. Query process 254 may include searching database 204 to identify whether the data requested by request 252 is stored in differences 222, checkpoints 220, cache 250, and/or other storage locations. Query process 254 may include identifying that the data indicated by request 252 is stored as a difference in differences 222.

In response, query process 254 may also include retrieving difference 256 from differences 222. Difference 256 may include a difference between a data point indicated by request 252 (e.g., a portion of a time series) and an inference intended to predict the data point indicated by request 252.

Difference 256 may be used for data reconstruction process 258. Data reconstruction process 258 may include obtaining difference 256 and inference 232. Inference 232 may be generated by database 204 and/or may be generated by another entity (e.g., database manager 202).

Generating inference 232 may include performing inference generation 230 process. While shown in FIG. 2C as being performed by database 204, it may be appreciated that inference generation 230 process may be performed by database manager 202 and/or any other entity without departing from embodiments disclosed herein. Inference generation 230 process may include: (i) identifying a checkpoint associated with the difference from checkpoints 220, (ii) using information from the checkpoint (e.g., information related to predictive model 224, information related to data points of the time series) to restore a state of predictive model 224, and/or (iii) feeding input data (e.g., a timestamp) into predictive model 224 to obtain inference 232 as an output from predictive model 224.

Difference 256 and inference 232 may be used for data reconstruction process 258. Data reconstruction process 258 may include, for example, adding difference 256 to inference 232 to obtain reconstructed data 260.

Reconstructed data 260 may include a full-size reconstructed form of the data indicated by request 252. Reconstructed data 260 may be used to service request 252. Servicing request 252 may include: (i) encapsulating reconstructed data 260 in a message and providing the message to downstream consumer 102A, (ii) feeding reconstructed data 260 into predictive model 224 to re-calibrate predictive model 224 for further inference generation, and/or (iii) other methods.

In an embodiment, the one or more entities performing the operations shown in FIGS. 2A-2C are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to manage data stored in a database. FIG. 3 illustrates methods that may be performed by the components of FIG. 1. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of managing data in accordance with an embodiment is shown. The method may be performed by a data processing system, database manager, data source, downstream consumer, database, and/or another device.

At operation 300, a portion of data for storage may be obtained. Obtaining the portion of the data for storage may include: (i) receiving the portion of the data from a data source (e.g., a data collector, a data aggregator), (ii) querying the data source and receiving the portion of the data in response to the querying, (iii) reading the portion of the data from another storage architecture, and/or (iv) other methods. Obtaining the portion of the data may also include receiving instructions indicating where the portion of the data is to be stored, etc.

At operation 302, it may be determined whether the portion is likely to be read after the portion is stored in a database. Determining whether the portion of the data is likely to be read after the portion is stored in the database may include: (i) identifying whether the portion of the data is anomalous with respect to the time-series relationship, and/or (ii) if the portion of the data is anomalous, concluding that the portion is likely to be read.

Identifying whether the portion of the data is anomalous with respect to the time-series relationship may include: (i) performing an anomaly detection process to identify a degree of anomalousness of the portion of the data, and/or (ii) comparing the degree of anomalousness to an anomalousness threshold. If the degree of anomalousness exceeds the anomalousness threshold, for example, the portion of the data may be considered anomalous.

Concluding that the portion is likely to be read may include: (i) labeling the portion of the data for storage in a full-size form (e.g., a checkpoint) in the database, (ii) obtaining a second portion of the data, the second portion of the data occurring prior to the portion of the data in the time-series relationship, and/or (iii) labeling the second portion of the data for storage in a full-size form in the database.

Determining whether the portion of the data is likely to be read after being stored in the database may also include: (i) obtaining historical read trends for the database, (ii) comparing the portion of the data to the historical read trends to identify whether the portion of the data would have been read in the past, and/or (iii) if it is determined that the portion of the data would have been read in the past, concluding that the portion is likely to be read.

Obtaining the historical read trends may include: (i) reading the historical read trends from storage, (ii) receiving the historical read trends from another entity, (iii) generating the historical read trends based on logs of past requests, and/or (iv) other methods.

Comparing the portion of the data to the historical read trends may include: (i) identifying one or more similarities between the portion of the data and the historical read trends, (ii) comparing the one or more similarities to any criteria (e.g., thresholds) to determine whether the historical read trends indicate an increased likelihood of the portion of the data being requested, and/or (iii) providing the portion of the data and the historical read trends to another entity responsible for determining whether the portion of the data is likely to be read.

Concluding that the portion is likely to be read may include: (i) labeling the portion of the data for storage in a full-size form (e.g., a checkpoint) in the database, (ii) obtaining a second portion of the data, the second portion of the data occurring prior to the portion of the data in the time-series relationship, and/or (iii) labeling the second portion of the data for storage in a full-size form in the database.

If the portion is likely to be read after the portion is stored in the database, the method may proceed to operation 304. If the portion is unlikely to be read after the portion is stored in the database, the method may proceed to operation 306.

At operation 304, the portion may be stored in the database. Storing the portion in the database may include: (i) generating a checkpoint using the portion of the data, (ii) performing a storing process to store the checkpoint in the database, and/or (iii) providing the portion and/or the checkpoint to another entity responsible for managing the database.

Storing the portion in the database may also include, if the portion of the data was previously stored as a difference (e.g., in the database or elsewhere): (i) reconstructing the portion of the data using the difference and an inference intended to predict the portion of the data, and/or (ii) storing the reconstructed portion of the data in the database.

The method may end following operation 304.

Returning to operation 302, the method may proceed to operation 306 if the portion is unlikely to be read after the portion is stored in the database.

At operation 306, a reduced-size representation of the portion is obtained. Obtaining the reduced-size representation of the portion may include: (i) obtaining, using a predictive model, an inference for the portion of the data, (ii) obtaining a difference between the inference and the portion of the data, and/or (iii) obtaining the reduced-size representation using the difference.

Obtaining the inference may include: (i) obtaining the predictive model, (ii) feeding input data into the predictive model, and/or (iii) obtaining an output of the predictive model, the output including the inference.

Obtaining the predictive model may include training the predictive model using training data. The predictive model may be trained, for example, to predict data from data sources.

Obtaining the difference may include: (i) performing a subtraction operation using the inference and the portion of the data, (ii) reading the difference from storage, (iii) querying another entity to provide the difference, and/or (iv) other methods.

Obtaining the reduced-size representation using the difference may include: (i) treating the difference as the reduced-size representation, (ii) encapsulating the difference and metadata related to the difference in a data structure and treating the data structure as the reduced-size representation, and/or (iii) other methods. The metadata may indicate, for example, a nearest checkpoint to the difference, a timestamp associated with the difference, etc.

At operation 308, the reduced-size representation may be stored in the database rather than the portion. Storing the reduced-size representation in the database may include performing a storage process using the reduced-size representation to store the reduced-size representation in a portion of the database dedicated to reduced-size representations of data. Storing the reduced-size representation may also include compiling information related to the reduced-size representation (e.g., a timestamp, a nearest checkpoint, an instance of the predictive model used to generate an inference that was used to generate the difference) and storing the information along with the reduced-size representation in the database.

The method may end following operation 308.

At any time, a cache for the database may be populated using at least the predictive model. Populating the cache may include: (i) determining that a data point is likely to be read from storage, the data point being stored in the database as a reduced-size representation of data (e.g., a difference), (ii) obtaining an inference, the inference being generated using the predictive model and the inference being intended to predict a measurement associated with the data point, (iii) reconstructing, using the difference and the inference, the data point, and/or (iv) storing the data point in the cache.

Obtaining the inference may include: (i) identifying a nearest checkpoint to the data point, the nearest checkpoint being a member of a same time series as the data point at an earlier point in time, (ii) utilizing information included in the nearest checkpoint to initiate inference generation, and/or (iii) generating any number of inferences starting from a time stamp associated with the checkpoint until the inference intended to predict the data point is generated.

Figure 4:
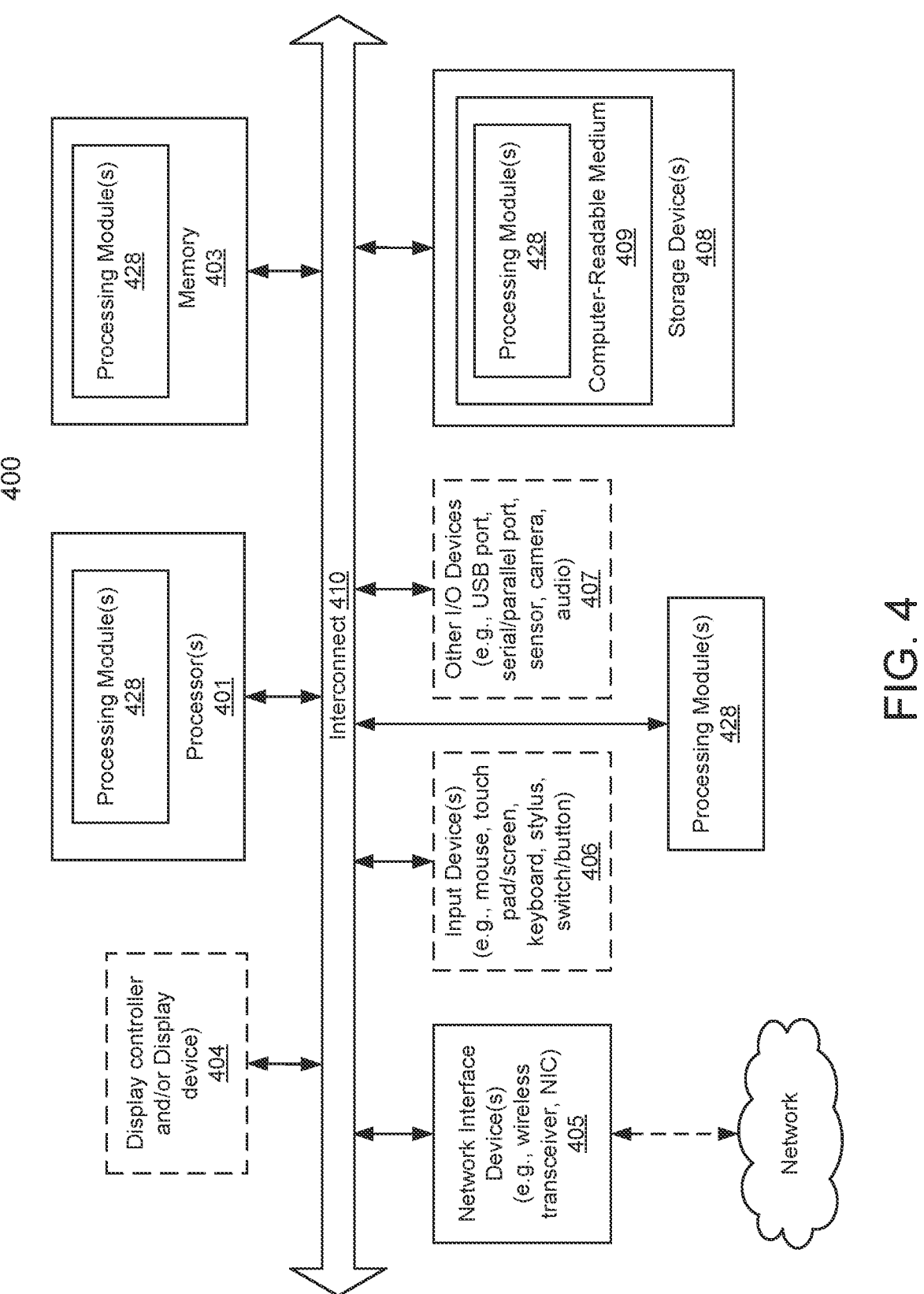
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing data, the method comprising:
obtaining a portion of the data for storage;
making a determination regarding whether the portion is likely to be read after the portion is stored in a database;
in a first instance of the determination where the portion is likely to be read:
storing the portion in the database;
in a second instance of the determination where the portion is unlikely to be read:
obtaining a reduced-size representation of the portion using a predictive model trained to predict a time-series relationship, wherein the reduced-size representation comprises a plurality identifiers of checkpoints;
storing the reduced-size representation rather than the portion in the database;
populating a cache for the database using the predictive model; and
reconstructing the data based on the checkpoints.

2. The method of claim 1, wherein the portion of the data comprises information regarding a time-series relationship.

3. The method of claim 2, wherein making the determination comprises:

identifying whether the portion of the data is anomalous with respect to the time-series relationship; and in an instance of the identifying where the portion of the data is anomalous:

concluding that the portion is likely to be read.

4. The method of claim 2, wherein making the determination comprises:

obtaining historical read trends for the database;

comparing the portion of the data to the historical read treads to identify whether the portion of the data would have been read in the past; and in an instance of the identifying where the portion of the data would have been read in the past:

concluding that the portion is likely to be read.

5. The method of claim 1, wherein obtaining the reduced-size representation of the portion comprises:

obtaining, using the predictive model, an inference for the portion of the data;

obtaining a difference between the inference and the portion of the data; and obtaining the reduced-size representation using the difference.

6. The method of claim 5, wherein the inference and the difference are usable to obtain the portion of the data.

7. The method of claim 6, wherein the portion of the data comprises information regarding the time-series relationship.

8. The method of claim 1, wherein making the determination is based, at least in part, on a set of rules.

9. The method of claim 8, wherein the set of the rules is based on portions of the data already stored in the database and the set of the rules indicates:

portions of the data are to be stored in the database as full-size forms of data at regular intervals; and the portion is to be stored in the database as a full-size form of the data even when the determination concludes that the portion is unlikely to be read based on the regular intervals.

10. A non-transitory machine-readable medium having instructions stored therein, which when executed by a processor, cause the processor to perform operations for managing data, the operations comprising:

obtaining a portion of the data for storage;

making a determination regarding whether the portion is likely to be read after the portion is stored in a database;

in a first instance of the determination where the portion is likely to be read:

storing the portion in the database;

in a second instance of the determination where the portion is unlikely to be read:

obtaining a reduced-size representation of the portion using a predictive model trained to predict a time-series relationship, wherein the reduced-size representation comprises a plurality identifiers of checkpoints;

storing the reduced-size representation rather than the portion in the database;

populating a cache for the database using the predictive model; and reconstructing the data based on the checkpoints.

11. The non-transitory machine-readable medium of claim 10, wherein the portion of the data comprises information regarding a time-series relationship.

12. The non-transitory machine-readable medium of claim 11, wherein making the determination comprises:

identifying whether the portion of the data is anomalous with respect to the time-series relationship; and in an instance of the identifying where the portion of the data is anomalous:

concluding that the portion is likely to be read.

13. The non-transitory machine-readable medium of claim 11, wherein making the determination comprises:

obtaining historical read trends for the database;

comparing the portion of the data to the historical read treads to identify whether the portion of the data would have been read in the past; and in an instance of the identifying where the portion of the data would have been read in the past:

concluding that the portion is likely to be read.

14. The non-transitory machine-readable medium of claim 10, wherein obtaining the reduced-size representation of the portion comprises:

obtaining, using the predictive model, an inference for the portion of the data;

obtaining a difference between the inference and the portion of the data; and obtaining the reduced-size representation using the difference.

15. The non-transitory machine-readable medium of claim 14, wherein the inference and the difference are usable to obtain the portion of the data.

16. The non-transitory machine-readable medium of claim 10, wherein making the determination is based, at least in part, on a set of rules.

17. A data processing system, comprising:

a processor; and a memory coupled to the processor to store instructions, which when executed by the processor, cause the processor to perform operations for managing data, the operations comprising:

obtaining a portion of the data for storage;

making a determination regarding whether the portion is likely to be read after the portion is stored in a database;

in a first instance of the determination where the portion is likely to be read:

storing the portion in the database;

in a second instance of the determination where the portion is unlikely to be read:

obtaining a reduced-size representation of the portion using a predictive model trained to predict a time-series relationship, wherein the reduced-size representation comprises a plurality identifiers of checkpoints;

storing the reduced-size representation rather than the portion in the database;

populating a cache for the database using the predictive model; and reconstructing the data based on the checkpoints.

18. The data processing system of claim 17, wherein the portion of the data comprises information regarding a time-series relationship.

19. The data processing system of claim 18, wherein making the determination comprises:

identifying whether the portion of the data is anomalous with respect to the time-series relationship; and in an instance of the identifying where the portion of the data is anomalous:

concluding that the portion is likely to be read.

20. The data processing system of claim 18, wherein making the determination comprises:

obtaining historical read trends for the database;

comparing the portion of the data to the historical read treads to identify whether the portion of the data would have been read in the past; and in an instance of the identifying where the portion of the data would have been read in the past:

concluding that the portion is likely to be read.

\* \* \* \* \*